Patented Oct. 31, 1950

2,527,963

UNITED STATES PATENT OFFICE 2,527,963

β-DIMETHYLAMINO-ETHYL p-HALOBENZ-HYDRYL ETHERS AND THEIR SALTS

George Rieveschl, Jr., Grosse Pointe Woods, Mich., assignor to Parke, Davis & Company, Detroit, Mich., a corporation of Michigan No Drawing. Application June 16, 1948, Serial No. 33,432

9 Claims. (Cl. 260—567.6)

This invention relates to a specific class of substituted β-dialkylaminoalkyl benzhydryl ethers and their salts and to methods for obtaining the same. More particularly, the invention relates to β-dimethylaminoethyl p-halobenzhydryl ethers and their salts. The free base of the amino ethers of this invention have the formula,

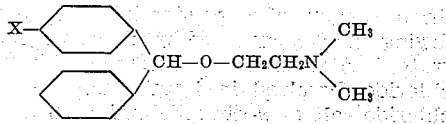

where X is a halogen atom that is, fluorine, chlorine, bromine or iodine atom.

The products of the present invention may be obtained as a free base having the formula given above or as an acid addition salt of the base with inorganic or organic acids. Some examples of the salts which may be prepared by the methods hereinafter described are the hydrochloride, hybrobromide, hydroiodide, sulfate, phosphate, acetate, citrate, oxalate, succinate, tartrate, benzoate, phthalate, malate, oleate and the like.

In its broader aspects the invention includes the quaternary ammonium, as well as the acid addition salts of the β-dimethylaminoethyl p-halobenzhydryl ethers. These quaternary ammonium salts are prepared by reacting an alkyl or aralkyl halide, a dialkyl sulfate or an alkyl aryl sulfonate with the free base of the β-dimethylaminoethyl p-halobenzhydryl ether. The quaternary ammonium halides can also be prepared by the reaction of a β-haloethyl p-halobenzhydryl ether with a dimethyl-alkyl-amine. Some specific examples of the quaternary ammonium salts which can be produced by the foregoing methods are the methochloride, methobromide, methiodide, methosulfate, methyl p-toluene sulfonate and the benzyl chloride salts.

The β-dimethylaminoethyl p-halobenzhydryl ethers can be prepared by several different processes. For example, they may be prepared by the condensation of a p-halobenzhydryl halide with β-dimethylaminoethanol. The condensation of these two reactants may be carried out by several different methods, for example, it may be effected in the presence or absence of an acid binding agent or with or without a solvent. Another method for preparing these compounds consists in reacting an alkali metal salt of a p-halobenzhydryl with a β-dimethylaminoethyl halide or, if desired, the reactants may be interchanged and an alkali metal salt of β-dimethylaminoethanol reacted with a p-halobenzhydryl halide. A further method of preparation consists in reacting a β-haloethyl-p-halobenzhydryl ether with dimethylamine.

The free bases, the acid addition salts and the quaternary ammonium salts of the β-dimethylaminoethyl p-halobenzhydryl ethers of the invention are powerful antihistamine agents. They are also useful in preventing smooth muscle spasms induced by histamine, acetyl choline or barium chloride. These new products may be administered to humans orally, parenterally, rectally or as a vapor or mist. They find particular use in humans for the treatment of allergic conditions (asthma, urticaria, histamine cephlagia and anaphylactic shock) and smooth muscle spasms (biliary spasms and dysmenorrhea).

The invention is illustrated by the following examples:

*Example 1.—β-Dimethylaminoethyl p-fluorobenzhydryl ether*

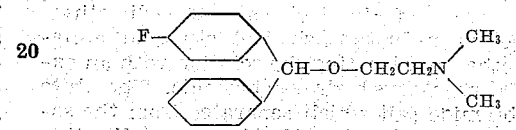

25 cc. of acetyl bromide is added slowly to 40.4 g. of p-fluorobenzhydrol dissolved in 50 cc. of benzene. After the addition has been completed the reaction mixture is refluxed for one-half hour and then the benzene, excess acetyl bromide and the acetic acid which is formed distilled off under reduced pressure to obtain the desired p-fluorobenzhydryl bromide.

The p-fluorobenzhydryl bromide prepared above is dissolved in about 20 cc. of xylene and the solution added slowly to a refluxing solution of 40 cc. of β-dimethylaminoethanol in 50 cc. of xylene. After the addition has been completed the reaction mixture is refluxed for about four hours, cooled and treated with about 100 cc. of water. The layers are separated, the aqueous layer extracted once with ether and then discarded. The ether extract is combined with the organic layer, the combined extract washed with water and then extracted with several portions of dilute hydrochloric acid (about 20 cc. of concentrated hydrochloric acid in 50 cc. of water). The acidic extract is clarified by extracting it once with ether, the ether discarded and the aqueous solution made alkaline with 40 or 50% sodium hydroxide solution. The free base of β-dimethylaminoethyl p-fluorobenzhydryl ether which separates is extracted from the aqueous solution with several portions of ether, the ether extracts washed with water and then dried over anhydrous potassium carbonate. The drying agent is removed by filtration and the filtrate treated with an excess of dry hydrogen chloride dissolved in isopropanol. The hydrochloride salt of β-dimethylaminoethyl p - fluorobenzhydryl ether which separates is collected and purified by recrystallization from isopropanol-ether mixture; M. P. 109–11° C.

If desired, the β-dimethylaminoethyl p-fluorobenzhydryl ether may be isolated from the above reaction mixture as the free base rather than as the hydrochloride salt. This is accomplished by evaporating the ether from the dry ether extract containing the crude free base of β-dimethylaminoethyl p-fluorobenzhydryl ether and distilling the residue under reduced pressure. (about 1 to 3 mm. of Hg). The β-dimethylaminoethyl p-fluorobenzhydryl ether thus obtained is a light yellow to colorless oily liquid.

The acid addition salts of β-dimethylaminoethyl p-fluorobenzhydryl ether can be prepared either from the crude free base, as illustrated above in the case of the hydrochloride salt, or from the purified free base. When starting with the purified free base, one dissolves it in an alcohol, ether, benzene or the like and then adds the solution to, or to the solution, the acid corresponding to the desired salt. For example, the oxalate salt may be prepared as follows:

10 g. of the free base of β-dimethylaminomethyl p-fluorobenzhydryl ether is dissolved in a small amount of isopropanol and the resulting solution added with stirring to a warm isopropanol solution containing one equivalent of oxalid acid monohydrate. The white, crystalline acid oxalate salt of β-dimethyl-aminoethyl p-fluorobenzhydryl ether which separates on cooling is collected and purified by recrystallization from isopropanol.

The hydrobromide salt can be prepared by dissolving 10 g. of the free base of β-dimethylaminoethyl p-fluorobenzhydryl ether in anhydrous ether and treating the solution with an excess of dry, gaseous hydrogen bromide. The white hydrobromide salt which separates from the solution is collected and purified by recrystallization from isopropanol.

β - (p - Fluorobenzhydryloxy) ethyl trimethylammonium iodide may be prepared by dissolving 10 g. of β-dimethylaminoethyl p-fluorobenzhydryl ether in about 70 cc. of acetone and adding 5.2 g. of methyl iodide dissolved in 20 cc. of acetone slowly to the solution with stirring. The resultant mixture is allowed to stand about ten hours, the product collected and purified by recrystallization from ethanol.

6.8 g. of methyl p-toluenesulfonate is added slowly to 10 g. of β-dimethylaminoethyl p-fluorobenzhydryl ether in 50 cc. of benzene. After the addition has been completed the mixture is allowed to stand for about four or five hours, diluted with ether and the crystalline product removed by filtration. The crude β-(p-fluorobenzhydryloxy) ethyl trimethylammonium p-toluenesulfonate is purified by recrystallization from isopropanol-ethyl acetate mixture.

The ethyl benzene sulfonate salt can be obtained by using an equivalent amount of ethyl benzene sulfonate instead of methyl p-toluenesulfonate in the above procedure.

*Example 2.—β - Dimethylaminoethyl p - chlorobenzhydryl ether*

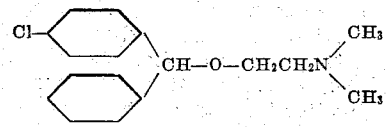

25 cc. of acetyl bromide is added cautiously to 43.7 g. of p-chlorobenzhydrol in 50 cc. of benzene and the resulting mixture heated under reflux for one-half hour. The benzene, excess acetyl bromide and acetic acid are removed by distillation in vacuo to obtain the desired p-chlorobenzhydryl bromide.

The p-chlorobenzhydryl bromide prepared above is dissolved in about 20 cc. of xylene and the solution added slowly to a refluxing solution of 40 cc. of β-dimethylaminoethanol in 50 cc. of xylene. After the addition has been completed the reaction mixture is refluxed about four hours, cooled and treated with about 100 cc. of water. The layers are separated, the aqueous layer extracted once with ether and then discarded. The ether extract is combined with the organic layer, the combined extract washed with water and then extracted with several portions of dilute hydrochloric acid. The acidic extract is clarified by extracting it once with ether, the ether discarded and the aqueous solution made alkaline with 40 or 50% sodium hydroxide solution. The free base of β-dimethylaminoethyl p-chlorobenzhydryl ether which separates is extracted from the aqueous solution with several portions of ether, the ether extracts washed with water and then dried over anhydrous potassium carbonate. The drying agent is removed by filtration and the filtrate treated with an excess of dry hydrogen chloride dissolved in isopropanol. The hydrochloride salt of β-dimethylaminoethyl p-chlorobenzhydryl ether which separates is collected and purified by recrystallization from isopropanol-ether mixture; M. P. 134–6° C.

If desired, the free base may be isolated rather than the hydrochloride salt in the above procedure. This is carried out by evaporating the ether from the dry ether extract containing the β-dimethylaminoethyl p-chlorobenzhydryl ether. The free base so obtained can be purified either by distillation or via one of its acid addition salts followed by neutralization.

4.5 g. of benzyl chloride is added to 10 g. of β-dimethylaminoethyl p-chlorobenzhydryl ether in 50 cc. of benzene and the mixture warmed on a steam bath for eight hours. The mixture is cooled, the crystalline β-(p-chlorobenzhydryloxy) ethyl dimethylbenzylammonium chloride collected are purified by recrystallization from absolute ethanol-ethyl acetate mixture.

4.4 g. of dimethyl sulfate is added slowly to a solution of 10 g. of β-dimethylaminoethyl p-chlorobenzhydryl ether in 50 cc. of ether and after the addition has been completed the mixture allowed to stand for about four hours. The crystalline β-(p-chlorobenzhydryloxy) ethyl trimethylammonium methosulfate is collected and purified by crystallization from absolute ethanol-ether mixture.

*Example 3.—β-Dimethylaminoethyl p-bromobenzhydryl ether*

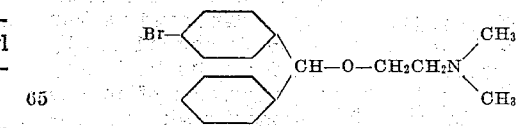

12.5 cc. of acetyl bromide is added slowly to a solution of 26.3 g. of p-bromobenzhydrol in about 30 cc. of benzene. After the addition has been completed the reaction mixture is refluxed for one hour and then the benzene, excess acetyl bromide and acetic acid removed by distillation in vacuo to obtain the desired p-bromobenzhydryl bromide.

The p-bromobenzhydryl bromide prepared as described above is dissolved in about 15 cc. of xylene and the solution added slowly to a refluxing solution of 20 cc. of β-dimethylaminoethanol in 25 cc. of xylene. After the addition has been completed the reaction mixture is refluxed for about three to four hours, cooled and treated with about 50 cc. of water. The layers are separated, the aqueous solution extracted once with ether and the aqueous layer discarded. The ether extract is combined with the organic layer, the combined extract washed with water and then extracted with several portions of dilute hydrochloric acid. The acidic aqueous extract is clarified by extraction once with ether, the ether discarded and the aqueous solution made alkaline with 50% sodium hydroxide solution. The free base of the β-dimethylaminoethyl p-bromobenzhydryl ether which separates is extracted with ether, the ether extracts dried over anhydrous potassium carbonate and the drying agent removed by filtration. Evaporation of the ether from the filtrate yields the desired β-dimethylaminoethyl p-bromobenzhydryl ether as a light colored oil. If desired, the ether filtrate of the free base obtained above can be treated with an excess of dry hydrogen chloride in isopropanol to form the hydrochloride salt. The hydrochloride salt of the β-dimethylaminoethyl p-bromobenzhydryl ether which separates from the solution is collected and purified by recrystallization from isopropanol; M. P. 144–5° C.

Quaternary ammonium salts of β-dimethylaminoethyl p-bromobenzhydryl ether can be prepared as described in the preceding examples. The methochloride salt is obtained as follows:

10 g. of the free base of β-dimethylaminoethyl p-bromobenzhydryl ether is dissolved in 75 cc. of dry benzene and dry methyl chloride passed through the solution until no more solid separates. The mixture is allowed to stand for about four or five hours and the β-(p-bromobenzhydryloxy)-ethyl trimethylammonium chloride collected and purified by recrystallization from isopropanol.

*Example 4.—β-Dimethylaminoethyl p-iodobenzhydryl ether*

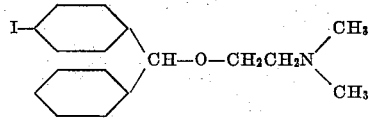

25 cc. of acetyl bromide is added slowly with stirring to a solution of 62 g. of p-iodobenzhydrol in 50 cc. of benzene and after the addition has been completed the reaction mixture is refluxed for one hour. The benzene, excess acetyl bromide and the acetic acid formed in the reaction are removed by distillation in vacuo to obtain the desired p-iodobenzhydryl bromide.

The p-iodobenzhydryl bromide prepared as described above is dissolved in about 20 cc. of xylene and the solution added to a refluxing solution of 40 cc. of β-dimethylaminoethanol in 50 cc. of xylene. After the addition has been completed the reaction mixture is refluxed for about two hours, cooled and treated with about 100 cc. of water. The aqueous layer is extracted once with ether and then discarded. The ether extract is added to the organic layer, the mixture washed with water and then extracted with dilute hydrochloric acid. The acidic aqueous extract is clarified by extracting it once with ether, the ether discarded and the aqueous solution made alkaline with 50% sodium hydroxide solution. The free base of β-dimethylaminoethyl p-iodobenzhydryl ether which separates is extracted with ether, the ether extracts dried over potassium carbonate. The drying agent is removed by filtration and the filtrate treated with an excess of dry hydrogen chloride dissolved in isopropanol. The hydrochloride salt of β-dimethylaminoethyl p-iodobenzhydryl ether which separates is collected and purified by recrystallization from isopropanol-ether mixture; M. P. 162.5–164.5° C.

5 g. of β-dimethylaminoethyl p-iodobenzhydryl ether hydrochloride is dissolved in water, the solution made alkaline with sodium hydroxide solution and the free base of the β-dimethylaminoethyl p-iodobenzhydryl ether which separates extracted with ether. The ether extracts are dried and the ether distilled to obtain the free base as a light yellow to colorless oil.

The quaternary ammonium salts of the amino ether of this example can be prepared in the same manner as described in the preceding examples.

What I claim is:

1. A compound of the class consisting of a free base, its quaternary ammonium salts and its acid addition salts, said free base having the formula,

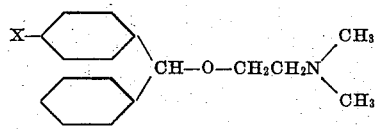

where X is a halogen atom.

2. A compound selected from the class consisting of a free base and its water soluble salts, said free base having the formula

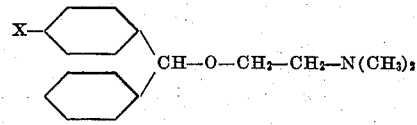

wherein X represents a member selected from the group consisting of chlorine and bromine.

3. A free base of the formula,

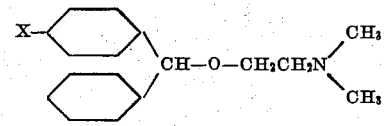

where X is a halogen atom.

4. A quaternary ammonium salt of a free base of formula,

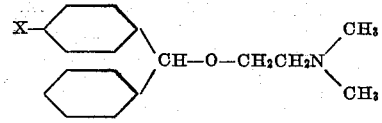

where X is a halogen atom.

5. An acid addition salt of a free base of formula,

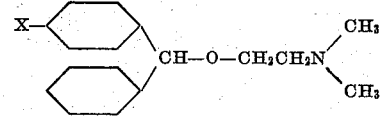

where X is halogen atom.

6. A hydrochloride salt of a free base of formula,

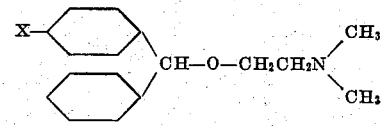

where X is a halogen atom.

7. β-Dimethylaminoethyl p-fluorobenzhydryl ether hydrochloride.
8. β-Dimethylaminoethyl p-bromobenzhydryl ether hydrochloride.
9. β-Dimethylaminoethyl p-iodobenzhydryl ether hydrochloride.

GEORGE RIEVESCHL, Jr.

REFERENCES CITED

The following references are of record in the file of this patent:

UNITED STATES PATENTS

| Number | Name | Date |
| --- | --- | --- |
| 2,397,799 | Martin | Apr. 2, 1946 |
| 2,421,714 | Rieveschl | June 3, 1947 |
| 2,427,878 | Rieveschl | Sept. 23, 1947 |
| 2,437,711 | Rieveschl | Mar. 16, 1948 |
| 2,455,949 | Rieveschl | Dec. 14, 1948 |

OTHER REFERENCES

Loew et al., "J. Pharmacol," vol. 83, pages 120–129 (Feb. 1945).
Loew et al., "Proc. Soc. Exp. Biol. Med.," vol. 58, pages 235–237 (March 1945).
Wells et al., "J. Pharmacol. Exp. Therap.," vol. 85, page 122 (October 1945).
Winder et al., "J. Pharmacol.," vol. 87, pages 121–131 (1946).